Jan. 10, 1928.

W. A. HOUSTON 1,655,699

COMPOSITE LUMBER

Filed Sept. 8, 1927

Inventor
W. A. Houston,
By Richard Richard,
his Attorneys

Patented Jan. 10, 1928.

1,655,699

UNITED STATES PATENT OFFICE.

WILLIAM A. HOUSTON, OF LEWISBURG, TENNESSEE.

COMPOSITE LUMBER.

Application filed September 8, 1927. Serial No. 218,149.

This invention relates to composite lumber, and has for its object to provide an article of this character which will be strong, durable and inexpensive, and also capable of convenient assemblage in erecting a wall or for any other purpose to which the article is adapted, and which will be ornamental and attractive in appearance.

With these and other objects in view, the present invention consists in the combination and arrangement of parts as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

In the drawings.

Like reference characters indicate like parts throughout the several views in the drawings.

The composite lumber of the present invention is made up of three plies which have been designated A, B and C. The plies A and B are made up of rectangular blocks of wood, preferably oblong and of the relative proportions of a standard brick, the wooden blocks being arranged to give the appearance of a brick wall. The ply C is a flexible woven fabric, preferably cheese-cloth saturated with glue thereby to hold the wooden plies A and B together in a simple and efficient manner.

Figure 1:
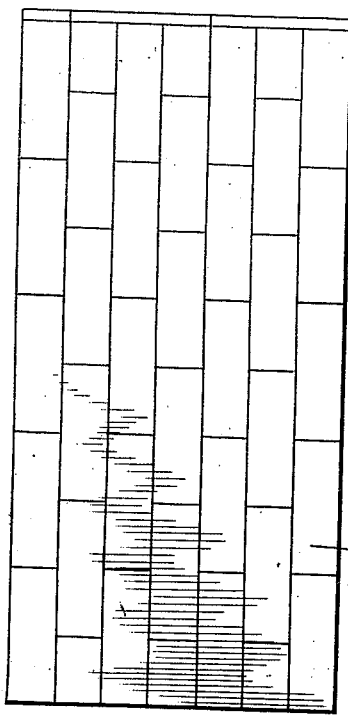
Figure 1 is an elevation of a piece of compound lumber embodying the features of the present invention.
Figure 3:
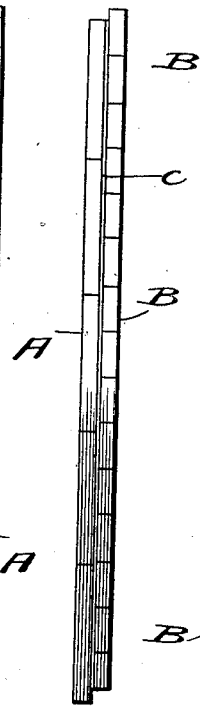
Figure 3 is an edge elevation of Figure 2 looking at the left-hand edge thereof.
Figure 2:
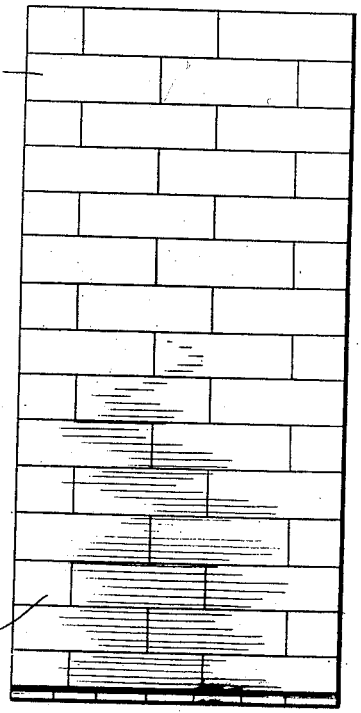
Figure 2 is an elevation of the opposite side of Figure 1.
Figure 4:
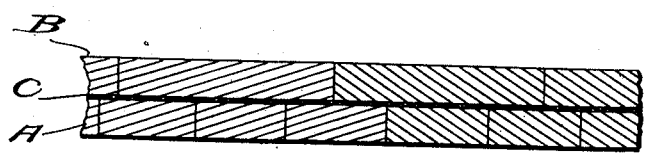
Figure 4 is an enlarged detail fragmentary sectional view taken through a piece of composite lumber embodying the features of the present invention.

In assembling or building up a piece of composite lumber, in accordance with the present invention, the wooden blocks of one layer, as for instance layer A, are arranged longitudinally of the slab, as best illustrated in Figure 1 of the drawings, and disposed so as to break joints in accordance with the ordinary method of laying bricks. Of course the greater number of the wooden blocks are uniform as to size and shape, but alternate terminal blocks are one-half the lengths of the main blocks so as to fill out the rectangular slab. The blocks of the other ply B, are of the same size and shape as those of ply A, but are disposed transversely with respect to the blocks of ply A, and also disposed so as to break joints therewith as best illustrated in Figures 3 and 4 of the drawings. It will of course be understood that the grain of the wood runs longitudinally of each block, so that by arranging the blocks of one ply or layer transversely or at right angles to those of the other ply or layer, a very strong and durable structure is produced.

While a slab of the present invention may be of any size, it has been found convenient to have the length of the slab equal to the combined lengths of five full-sized blocks and the width of the slab equal to the combined widths of seven blocks, but it will of course be understood that these numbers may be varied to produce slabs of different dimensions.

After assembling the ply or layer of blocks, a piece of fabric of the desired dimensions is saturated with glue and placed downwardly upon the top of the assembled blocks, and thereafter the other ply or layer of blocks is assembled upon the top of the glue saturated fabric, and then the assembled slab is subjected to pressure, say 300 pounds to the square inch so as to eliminate air from between the plies, and then the slab is permitted to dry, and finally planed or sand-papered so as to give a smooth and attractive finish to either or both of the sides of the slab.

While any kind of wood may be employed, cedar will be found eminently satisfactory for the production of walls, the lining of closets and ice boxes and the like and for use in show-windows and in the manufacture of furniture; and many novelties.

Figure 5:
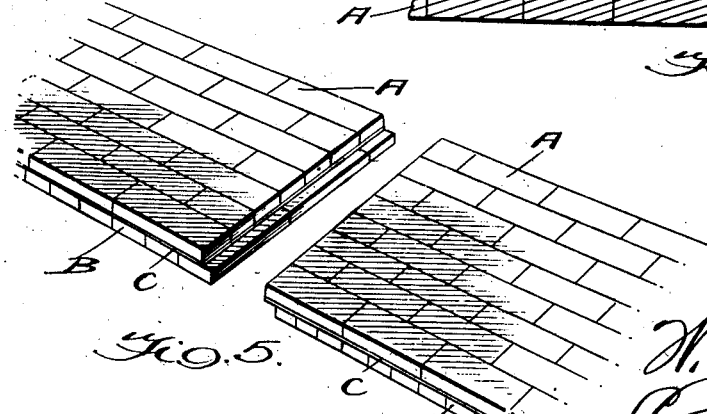
Figure 5 is a detail perspective view illustrating two pieces of composite lumber of the present invention in position to be assembled end for end.

For convenience in assembling a plurality of slabs to form a wall, lining, partitions or the like, one of the wooden plies or layers is projected at one end of the slab beyond the other layer and is arranged to come short of the opposite end of said other layer. In other words, the block layers alternately project at opposite ends of the slab so as to form in effect terminal rabbets, one at one side of the slab and the other at the other side of the slab, whereby two slabs, as best indicated in Figure 5 of the drawings, may be conveniently assembled end to end so as to produce a break joint terminal connection between abutted slabs.

What is claimed is:

1. A composite lumber slab made up of two layers of wooden blocks and an interposed glue-saturated layer of fabric, the blocks of each layer being disposed in break-joint arrangement and arranged transversely with respect to the blocks of the other ply or layer.

2. A composite lumber slab made up of two layers of wooden blocks and an interposed glue-saturated layer of fabric, the blocks of each layer being disposed in break-joint arrangement and arranged transversely with respect to the blocks of the other ply or layer, one layer of blocks projecting beyond the other layer at one end of the slab and terminating short of the end of the other layer of blocks at the opposite end of the slab and thereby affording rabbeted terminals.

3. The herein described method of making composite lumber, which consists in assembling a plurality of wooden blocks in break-joint arrangement, applying a glue-saturated fabric over the entire face of the assembled blocks, assembling another layer of blocks upon the glue-saturated fabric and disposed in break-joint arrangement transversely of the first-mentioned layer of blocks, and subjecting the assembled parts to pressure to eliminate air from between the layers of blocks.

WILLIAM A. HOUSTON.